No. 731,613. PATENTED JUNE 23, 1903.
A. H. RAYMOND.
COOKING UTENSIL.
APPLICATION FILED NOV. 28, 1902.
NO MODEL.
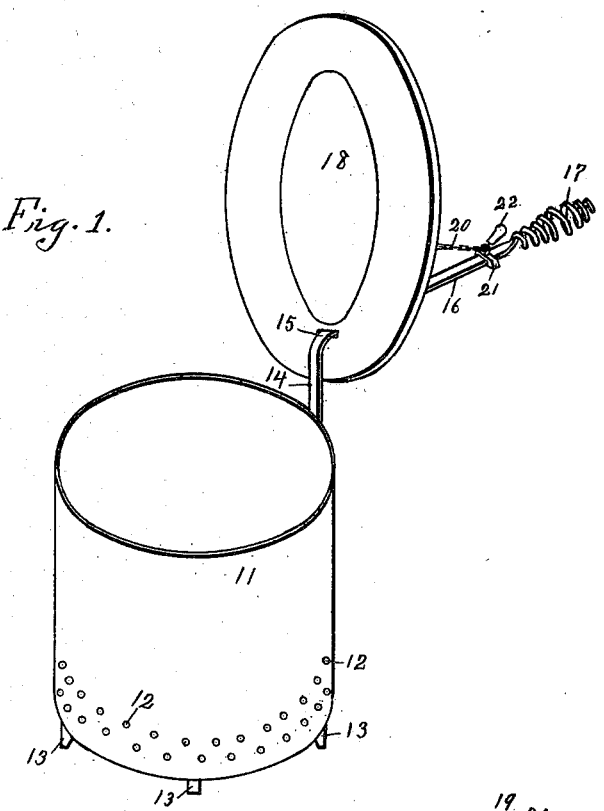
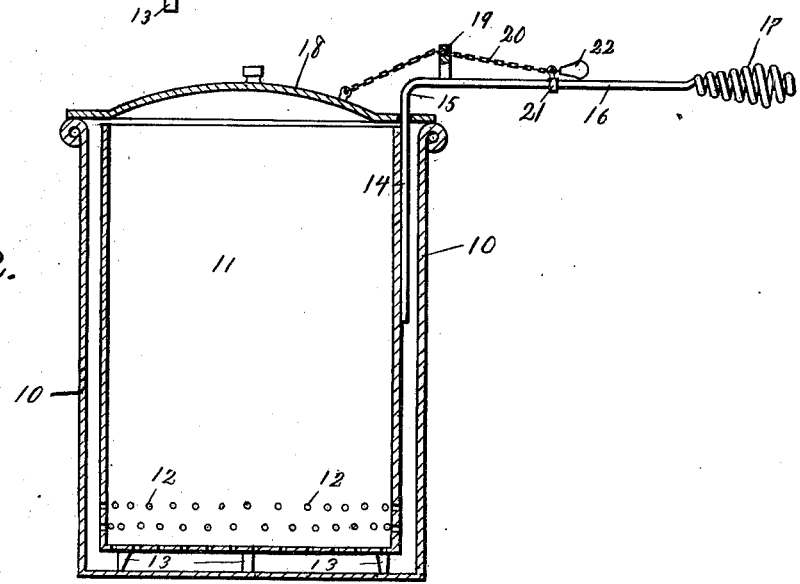

No. 731,613.

Patented June 23, 1903.

UNITED STATES PATENT OFFICE.

AUSTIN H. RAYMOND, OF KELLOGG, IOWA.

COOKING UTENSIL.

SPECIFICATION forming part of Letters Patent No. 731,613, dated June 23, 1903.

Application filed November 28, 1902. Serial No. 133,163. (No model.)

*To all whom it may concern:*

Be it known that I, AUSTIN H. RAYMOND, a citizen of the United States, residing at Kellogg, in the county of Jasper and State of Iowa, have invented certain new and useful Improvements in Cooking Utensils, of which the following is a specification.

The objects of my invention are to provide a cooking utensil of simple, durable, and inexpensive construction in which the articles to be cooked may be placed in an inner perforated receptacle and then the inner receptacle containing the articles to be cooked may be placed into a pot or outer receptacle containing water and the articles cooked by boiling or steaming, and at any time during the cooking process access may easily and quickly be had to the articles by simply removing the inner receptacle and allowing the water therein to drain into the outer receptacle, so that the articles being cooked may be conveniently and easily examined, and after they are cooked they may be conveniently removed and the water drained off, thus avoiding the annoyance and the impairing or waste of the articles of food which would be caused by removing them from the inner receptacle by means of a fork; and, further, my object is to provide a cover for the outer receptacle slidingly attached to the handle of the inner receptacle and to provide convenient and easily-operated means for removing this cover without touching it directly by hand, thus avoiding the danger of being burned by steam when removing the cover.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a perspective view of the inner receptacle with its cover in an elevated position, and Fig. 2 shows a vertical central sectional view through the entire utensil with the cover in its closed position.

Referring to the accompanying drawings, I have used the reference-numeral 10 to indicate the outer receptacle or pot, which is open at its top and may be of any ordinary shape or size.

The inner receptacle is indicated by the reference-numeral 11 and is preferably of the same contour as the outer receptacle, except that it is smaller. The lower end portion of the inner receptacle is perforated at 12, and on its bottom are a number of downwardly-projecting legs 13. Attached to the inner receptacle is a handle projecting straight upwardly at 14, curved at 15, projecting straight outwardly at 16 some distance above the outer receptacle, and on its outer end is a coiled non-heat-conducting handle 17.

The reference-numeral 18 indicates a cover slightly larger in diameter than the diameter of the top of the outer receptacle, and this cover is provided with a slot through which the handle is passed, thus permitting the cover to slide upon the handle. Formed on or fixed to the handle is an upwardly-projecting arm 19, and a chain 20 passes through an opening in the arm and is attached at one end to the top of the cover and at its other end to a collar 21, provided with a knob 22 and slidingly mounted upon the horizontal portion of the handle.

In practical use the articles to be cooked are first placed on the bottom of the inner receptacle, the outer receptacle is filled with water and placed upon a fire, and then the inner receptacle containing the articles to be cooked is placed in position in the outer receptacle. If it is desired to cook the articles by steam instead of by boiling, only a small quantity of water is placed in the outer receptacle. As soon as the inner receptacle is thus placed in position the cover will move by gravity to position, resting upon the top of the outer receptacle, and the legs on the inner receptacle will hold it some distance above the bottom of the outer receptacle, and obviously the inner receptacle may be used in connection with an outer receptacle of any height, because the cover may move vertically upon the handle, and access may be had to the interior of the inner receptacle at any time by sliding the knob outwardly on the handle, thus first elevating the cover, and then when it reaches the curved portion of the handle it will swing to the vertical position, as shown in Fig. 1, and after the articles are cooked the cover is raised first to the position shown in Fig. 1, and when the inner receptacle is removed from the outer receptacle the water will run through the perforations in the inner receptacle and remain in the outer receptacle.

Having thus described my invention, what I claim, and desire to secure by Letters Patent of the United States therefor, is—

1. An improved cooking utensil comprising in combination, an outer open-topped receptacle, an inner receptacle of smaller size perforated at its lower end portion, supporting-legs therefor, a handle fixed to the inner receptacle extending upwardly to a point above the top of the outer receptacle and then outwardly, and a cover slidingly mounted upon the handle, for the purposes stated.

2. An improved cooking utensil, comprising in combination, an outer open-topped receptacle, an inner receptacle of smaller size perforated at its lower end portion, supporting-legs therefor, a handle fixed to the inner receptacle extending upwardly to a point above the top of the outer receptacle and then outwardly, a cover slidingly mounted upon the handle, an arm projecting upwardly from the handle, a chain passed through the arm attached to the cover and slidingly connected with the handle, all arranged and combined in the manner set forth for the purposes stated.

AUSTIN H. RAYMOND.

Witnesses:
J. RALPH ORWIG,
W. R. LANE.